Oct. 26, 1937.  F. W. SCHMIDT  2,097,419
VISOR MIRROR
Filed Jan. 4, 1935

Inventor
Frank W. Schmidt
By Beaman + Langford
Attorney

Patented Oct. 26, 1937

2,097,419

UNITED STATES PATENT OFFICE 2,097,419

VISOR MIRROR

Frank W. Schmidt, Jackson, Mich., assignor to Ryerson & Haynes, Inc., Jackson, Mich., a corporation of Michigan Application January 4, 1935, Serial No. 442

1 Claim. (Cl. 88—98)

This invention relates to mirrors adapted to be secured to vehicle sun visors and more particularly to such mirrors constructed from sheet metal simulating plate glass. Heretofore mirrors have been attached to the back of vehicle, particularly automobile, sun visors for providing a vanity accessory. As will be readily understood the mirror is brought into position for use by rotating the sun visor down into its sun shielding position and may be moved back out of the way by returning the visor to its normal or up position.

It has been found that a metallic reflector provides a mirror which is normally less expensive and lighter in weight than the usual plate glass mirror and further it is not possessed of the usual hazard present wherever glass is used for any purpose.

An object of this invention is to provide a mirror for attachment to vehicle visors constructed of metal and simulating plate glass.

Another object of this invention is to provide a mirror for attachment to vehicle visors formed of highly polished sheet metal having angular reflecting edges providing the mirror with the appearance of plate glass.

Another object of this invention is to provide a novel attachment for the securing of supporting means to polished metal surface reflectors.

Figure 1:
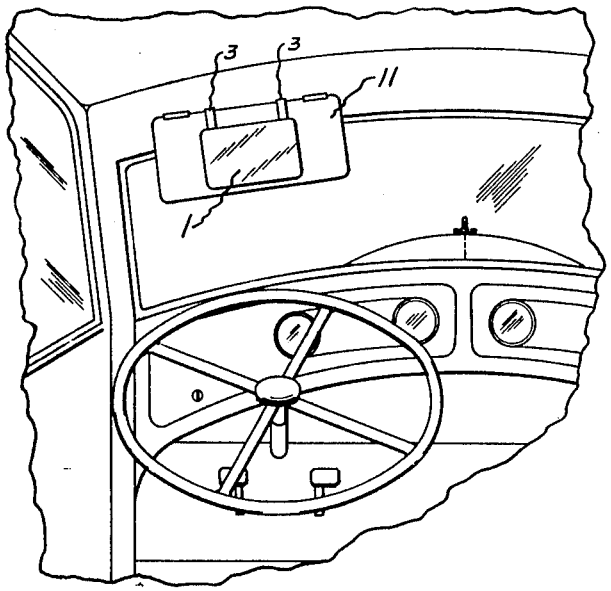
Figure 2:
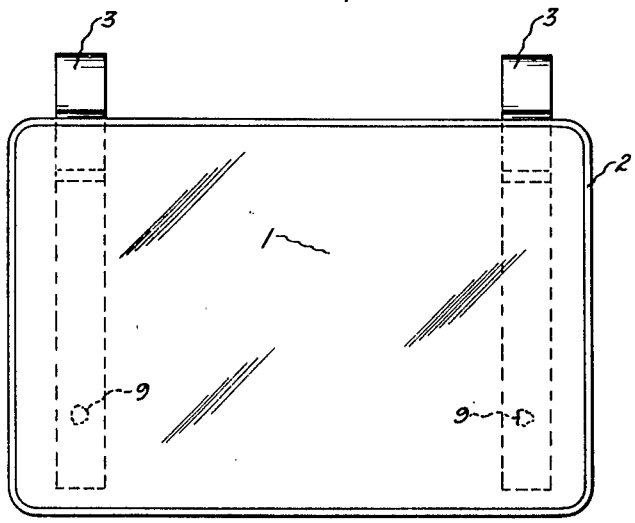
Figures 3, 4:
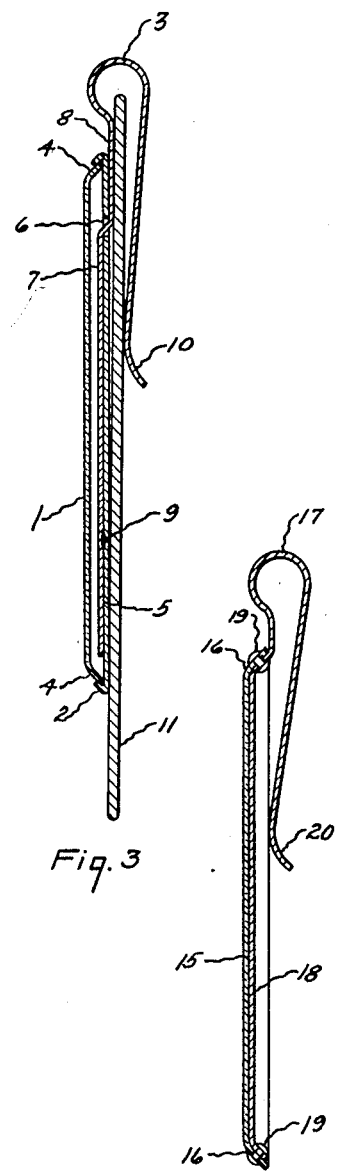

These and other objects will be apparent from the following specification when taken with the accompanying drawing in which Fig. 1 is a view of the invention in use on an automobile sun visor, Fig. 2 is an enlarged view of the mirror, Fig. 3 is an enlarged vertical cross section of the mirror disposed in position on a sun visor, and Fig. 4 is a vertical cross section of a modified form of the invention.

Referring particularly to Fig. 1 the mirror consists of essentially the reflecting portion 1, frame 2 and resilient securing clips 3. The reflecting portion 1 is fabricated of sheet metal and has a highly polished exterior surface. Its edges 4 are turned down providing the entire reflecting surface with the appearance of a beveled plate glass mirror. To enhance the appearance of the mirror and to avoid the necessity of welding the spring clips directly to the back of the reflecting surface, which would be detrimental to the polished outer surface, the frame 2 includes a backing plate 5 rolled over the outer portions of the edges 4 of the reflecting surface. At spaced positions in the upper portion of the backing plate 5, slots 6 are provided for receiving the offset portions 7 of the metallic strips 8. The metallic strips 8 are each spot welded as indicated at 9 to the backing plate 5. The metallic strips 8 are of resilient material and are return bent to form the securing clips 3. If desired, however, only the portion of the strips 8 forming the bendable section of the clips 3 need be of a resilient material. The free ends of the securing clips 3 are bent slightly outwardly as at 10 to facilitate the clipping of the mirror to the visor 11.

In Fig. 4 is illustrated another embodiment of the invention. In that embodiment the sheet metal reflecting surface 15 is provided with angularly disposed edges 16 as and for the purpose indicated in the first embodiment, namely, that of providing the mirror as a whole with the appearance of plate glass. In this modification, however, the resilient securing clip 17 has one elongated side 18 having a configuration similar to that of the under side of the reflecting surface 15 so that it may snugly engage the same throughout its length. It is secured to the turned down edges 16 of the reflecting surface 15 by rivets 19. The securing clips 17 are provided with turned up ends 20 similar to the turned up ends of the securing clips 3.

According to this invention the resilient clips 3 merely illustrate a preferred form of securing means and it is therefore contemplated that any other desired securing device be used if found expedient.

Having thus described my invention what I desire to secure by Letters Patent and claim is:

An attachment adapted to be secured to a side of a vehicle sun visor comprising a sheet metal surface polished to provide a reflector, integral angularly disposed edges bordering said surface, a substantially continuous backing plate for said surface and its angularly disposed edges spaced from said surface, portions of said backing plate angularly disposed with respect thereto and snugly engaging the outer margin of said angularly disposed edges to provide a frame, a plurality of slots in the upper portion of said backing plate, and means for securing said reflecting surface to the sun visor, said means comprising elongated strips having offset portions passing through said slots and disposed between said backing plate and said surface, and means spaced from said slots securing said strips to said backing plate.

FRANK W. SCHMIDT.